United States Patent Office 3,089,228
Patented May 14, 1963

3,089,228
MAGNETIC STRIP MATERIAL
Arnold Charles Lynch, Potters Bar, England, assignor to Her Majesty's Postmaster General, London, England
No Drawing. Filed July 21, 1958, Ser. No. 749,640
Claims priority, application Great Britain July 26, 1957
4 Claims. (Cl. 29—194)

The present invention relates to magnetic strip material and has for an object to provide an improved magnetic strip material suitable for use in the construction of magnetic information-storing devices. It is a further object of the invention to provide an improved method of producing magnetic strip material.

Magnetic material for use in computors and in similar devices for the storage of information should desirably possess the property of very rapid reversal of magnetisation when the magnetising field is reversed, and should also have a substantially rectangular hysteresis loop.

It has already been proposed to form thin films of magnetic alloys of a thickness of the order of 1 micron or less by depositing by evaporation a magnetic alloy, preferably consisting of 80% nickel and 20% iron.

It is also known to form thin magnetic strip by copper plating a comparatively thick strip of magnetic alloy, rolling the plated strip to give a desired thickness of magnetic alloy and then removing the copper. The rolling of very thin strip is a difficult operation requiring special machinery and techniques, although the provision of the copper plating permits a greater reduction in the thickness of the magnetic alloy than would be obtainable by rolling unplated magnetic alloy. The removal of the copper is necessary since the low electrical resistivity of the copper would prevent the desired rapid reversal of magnetism in the magnetic strip, and such removal of the copper is an inconvenient and expensive process.

By means of the present invention, there is provided a composite magnetic strip material which includes a layer of non-magnetic metal and in which the necessity for removing the non-magnetic layer is avoided and according to the invention, a magnetic strip material suitable for use in the construction of magnetic storage devices for storing information in computors and similar apparatus comprises a composite strip formed by at least one layer of ferro magnetic metal bonded to a layer of non-magnetic metal of high electrical resistivity.

According to a further feature of the invention, a method of producing such magnetic strip material comprises forming a composite body consisting of a layer of ferro magnetic metal bonded to a layer of non-magnetic metal of high electrical resistivity and subsequently rolling the body to produce the required composite strip.

The said body may comprise a compacted powdered body consisting of a layer of a mixture of powdered metals of a composition to give a magnetic alloy having the required magnetic properties, and a layer of powdered metals of a composition to give a non-magnetic alloy having high electrical resistivity, which body is sintered and subsequently rolled to produce a composite strip in which a layer of the magnetic alloy of a desired thickness is backed by a layer of the non-magnetic alloy having high electrical resistivity.

Alternatively, the said body may comprise a bar formed by layers of the magnetic and non-magnetic alloys bonded together as, for example, by hot pressure welding.

A suitable magnetic alloy for use according to the present invention is that described in copending application Serial No. 704,764, filed December 23, 1957, the said alloy having a composition of 80% nickel, 12% molybdenum and 8% iron, but it will be understood that alloys having other compositions may equally well be employed providing that they have the required switching properties, i.e. the property of rapid reversal of magnetism in an applied field.

The non-magnetic alloy must, as stated, be of high resistivity so that eddy currents which may be generated therein are not sufficiently strong to impair the desired rapid reversal of magnetism in the magnetic strip. It is preferable that the mechanical properties of the non-magnetic alloy be similar to those of the magnetic alloy in order to avoid stressing of the magnetic alloy during handling of the strip, and also the composition of the two alloys should be similar in order to minimise diffusion between the alloys during heat treatment. Thus, for use with the magnetic alloy described in the aforementioned co-pending application it is proposed to use a non-magnetic alloy having a composition of 76% nickel, 16% molybdenum and 8% iron. Such an alloy has high electrical resistivity of the order of 30 micro-ohm-centrimetres and is ferro magnetic at low temperatures but at normal atmospheric temperatures the Curie point of the alloy is exceeded and it can therefore be regarded as non-magnetic.

In one example of carrying out the method of producing magnetic strip according to the invention, 10 gm. of a mixture of nickel, iron and molybdenum powders in the proportions 80%, 8% and 12% respectively by weight is placed in a rectangular mould having an area of 8 cm. by 2.5 cm. and distributed on the bottom of the mould to form a layer of substantially uniform thickness. The mixture is then lightly compacted in order to avoid mechanical intermingling with a further mixture of powdered metals which is then added to form a second layer of powder in the mould. The compacting of the first layer may be improved by the addition of a few drops of water but the compacting must not be so firm that the further powder fails to unite with that of the first layer when heat treated. The said further mixture of powdered metals comprises 90 gm. of a mixture of nickel, iron and molybdenum powders in the proportion by weight of 76% nickel, 16% molybdenum and 8% iron, and as stated above the alloy produced by such a mixture is non-magnetic at normal atmospheric temperatures.

The powder mass in the mould is then compressed under a pressure of about 30 tons per square inch and the resulting compacted body is sintered by heating to 1300° C. for 5 hours in an atmosphere of hydrogen. During this time each layer of powder mixture forms an alloy having the proportions of the several components of the powder mixture and there is little penetration of one alloy into the other at the common boundary face.

The sintered body, which is approximately 5 mm. thick is subjected to cold-rolling and, after reduction to about half the thickness, to a brief annealing treatment at about 800° C. The material is subjected to further cold-rolling and annealing until the total thickness of the strip is reduced to 10 microns of which the magnetic layer is approximately 1 micron and the non-magnetic backing layer 9 microns thick.

In a further example of carrying out the method according to the invention, bars formed respectively of suitable magnetic and non-magnetic alloys and of a suitable thickness are placed together, heated to a suitable temperature and hot rolled so that they adhere together by the process known as hot pressure welding to form a composite bar. The composite bar is then subjected to successive cold-rolling and annealing treatments as described above to produce a strip of the required thickness.

It is convenient that before subjecting them to hot pressure welding the individual bars be reduced to a thickness, commensurate with ease of handling, such that the required number of subsequent operations of cold-rolling and annealing is correspondingly reduced in order to avoid as much as possible the diffusion of the alloying elements between the components of the strip due to repeated annealing treatments, such diffusion having an adverse effect on the required magnetic properties of the composite strip.

The strip material thus formed may be employed in known manner for the construction of magnetic cores or other magnetic information-storage devices.

Although in the above described embodiments of the invention there is porvided one layer of ferro magnetic metal backed by a single layer of non-magnetic metal, it will be understood that there may be more than two such layers. Thus, there may be a single supporting layer of non-magnetic metal having on each face thereof a layer of ferro magnetic metal of the strip may be of multiple-layer construction, in which the non-magnetic and ferro magnetic layers alternate. In every case, however, the ferro magnetic metal is in very thin layers which may be of a thickness of from 2 to 3 microns or less and the layers may even be as thin as 0.1 micron.

I claim:

1. A magnetic strip material for forming the core of a magnetic storage device consisting of a composite strip formed by at least one layer of a magnetic alloy having a composition of 80% nickel, 12% molybdenum and 8% iron bonded to a layer of a non-magnetic alloy having a composition of 76% nickel, 16% molybdenum and 8% iron.

2. A strip material suitable for use in constructing the magnetic core of a magnetic storage device consisting of at least one layer of a ferro-magnetic alloy bonded to another layer of a non-magnetic alloy having high electrical resistivity and containing substantially all the constituents of the magnetic alloy, one layer consisting of nickel, iron, and molybdenum in proportions placing the Curie point of the alloy at a temperature higher than the normal temperature of use of such storage devices so that the alloy is ferro-magnetic at such normal temperatures of use, and said other layer consisting of nickel, iron, and molybdenum in proportions placing the Curie point of said second alloy below the said normal temperature of use so that said second layer is non-magnetic at such normal temperature of use.

3. A magnetic strip material forming the core of a magnetic storage device consisting of a composite strip formed by at least one layer of a first alloy consisting of effective amounts of nickel, iron, and molybdenum, to render the alloy ferro-magnetic, said one layer being bonded to another layer of a second alloy consisting of effective amounts of nickel and iron, and a sufficient amount of molybdenum to render the alloy non-magnetic and of high electrical resistivity, the percentages of the ingredients in the two alloys being substantially similar to provide similar mechanical properties to the layers to avoid stressing of the magnetic layer during handling and working of the strip and to minimize diffusion between alloys during heat treatment thereof.

4. A magnetic strip material forming the core of a magnetic storage device consisting of a composite strip formed by at least one layer of a first alloy consisting of effective amounts of nickel, iron, and molybdenum, to render the alloy ferro-magnetic, the major proportion thereof being nickel, said one layer being bonded to another layer of a second alloy consisting of effective amounts of nickel and iron, and a sufficient amount of molybdenum to render the alloy non-magnetic and of high electrical resistivity, the major proportion thereof being nickel, the percentages of the ingredients in the two alloys being substantially similar to provide similar mechanical properties to the layers to avoid stressing of the magnetic layer during handling and working of the strip and to minimize diffusion between alloys during heat treatment thereof.

References Cited in the file of this patent

UNITED STATES PATENTS

| | | |
|---|---|---|
| 827,378 | Lewis | July 31, 1906 |
| 1,940,850 | Derby | Dec. 26, 1933 |
| 1,974,079 | Maier | Sept. 18, 1934 |
| 2,036,667 | Williams | Apr. 7, 1936 |
| 2,214,002 | Trainer | Sept. 10, 1940 |
| 2,288,184 | Dodson | June 30, 1942 |
| 2,682,702 | Fink | July 6, 1954 |
| 2,745,172 | Townsend | May 15, 1956 |
| 2,756,489 | Morris | July 31, 1956 |
| 2,818,360 | Porter | Dec. 31, 1957 |

OTHER REFERENCES

Metals Handbook, 1948 edition, pp. 550 and 551.